US011461183B2

(12) United States Patent
Govindan

(10) Patent No.: US 11,461,183 B2
(45) Date of Patent: Oct. 4, 2022

(54) TRIVIAL SNAPSHOTS

(71) Applicant: EMC IP Holding Company LLC, Hopkinton, MA (US)

(72) Inventor: Balasundaram Govindan, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 74 days.

(21) Appl. No.: 16/737,360

(22) Filed: Jan. 8, 2020

(65) Prior Publication Data

US 2021/0208975 A1    Jul. 8, 2021

(51) Int. Cl.
*G06F 3/06* (2006.01)
*G06F 11/14* (2006.01)

(52) U.S. Cl.
CPC ........ *G06F 11/1461* (2013.01); *G06F 3/0616* (2013.01); *G06F 3/0652* (2013.01); *G06F 3/0679* (2013.01); *G06F 11/1448* (2013.01)

(58) Field of Classification Search
CPC ............ G06F 11/1461; G06F 11/1448; G06F 3/0616; G06F 3/0652; G06F 3/0679
See application file for complete search history.

(56) References Cited

U.S. PATENT DOCUMENTS

| 9,639,701 | B1* | 5/2017 | Barajas Vargas | ....... G06F 21/78 |
| 9,928,246 | B1* | 3/2018 | Xu | ......... G06F 16/128 |
| 2004/0030951 | A1* | 2/2004 | Armangau | .......... G06F 11/1469 714/6.11 |
| 2010/0122020 | A1* | 5/2010 | Sikdar | ................... G06F 3/0665 711/103 |
| 2015/0242478 | A1* | 8/2015 | Cantwell | ............. H04L 12/1403 707/634 |
| 2015/0370643 | A1* | 12/2015 | Rueger | ............... G06F 11/1446 707/652 |
| 2017/0300247 | A1* | 10/2017 | Dewey | ................. G06F 11/2097 |
| 2020/0327015 | A1* | 10/2020 | Vargas | ................. G06F 11/1451 |
| 2020/0409803 | A1* | 12/2020 | Naidu | ................. G06F 11/1451 |
| 2021/0026671 | A1* | 1/2021 | Hadas | ................. G06F 9/45558 |

* cited by examiner

*Primary Examiner* — Nanci N Wong
(74) *Attorney, Agent, or Firm* — Amin, Turocy & Watson, LLP

(57) ABSTRACT

Creation of trivial snapshot instances is presented herein. A method comprises determining that a trivial snapshot instance representing a sub-grouping of storage devices included in an enterprise storage array device has not been accessed within a defined duration of time value; marking the trivial snapshot instance for deletion from the enterprise storage array device based on an expiration of the defined duration of time value; and deleting the trivial snapshot instance from the enterprise storage array device.

20 Claims, 12 Drawing Sheets

TRIVIAL SNAPSHOTS

TECHNICAL FIELD

The subject disclosure generally relates to embodiments for the generation or creation of trivial snapshots or binary state snapshots to simplify the snapshot lifecycle management process.

BACKGROUND

In enterprise storage arrays (e.g., a storage device or groupings of storage devices) storage administrators generally create snapshots of application volumes (e.g., partitions of the storage device and/or sub-groupings of the groupings of storage devices) for purposes of disaster recovery, test and/or development, permanent backup, transitory (temporary) backup purposes, and/or for purposes of data analysis and/or data analytics. These partitions of the storage device and/or groupings and/or sub-grouping of the enterprise storage arrays can be provided using pointer-base snapshots. Pointer-based snapshots generally can minimize unnecessary space allocation for the copies of partitions of the storage device and/or groupings and/or sub-grouping of the enterprise storage arrays at a defined instant of time (or at one or more defined instances in time) or for one or more defined durations of time.

BRIEF DESCRIPTION OF THE DRAWINGS

Non-limiting embodiments of the subject disclosure are described with reference to the following figures, wherein like reference numerals refer to like parts throughout the various views unless otherwise specified.

DETAILED DESCRIPTION

Figure 1:
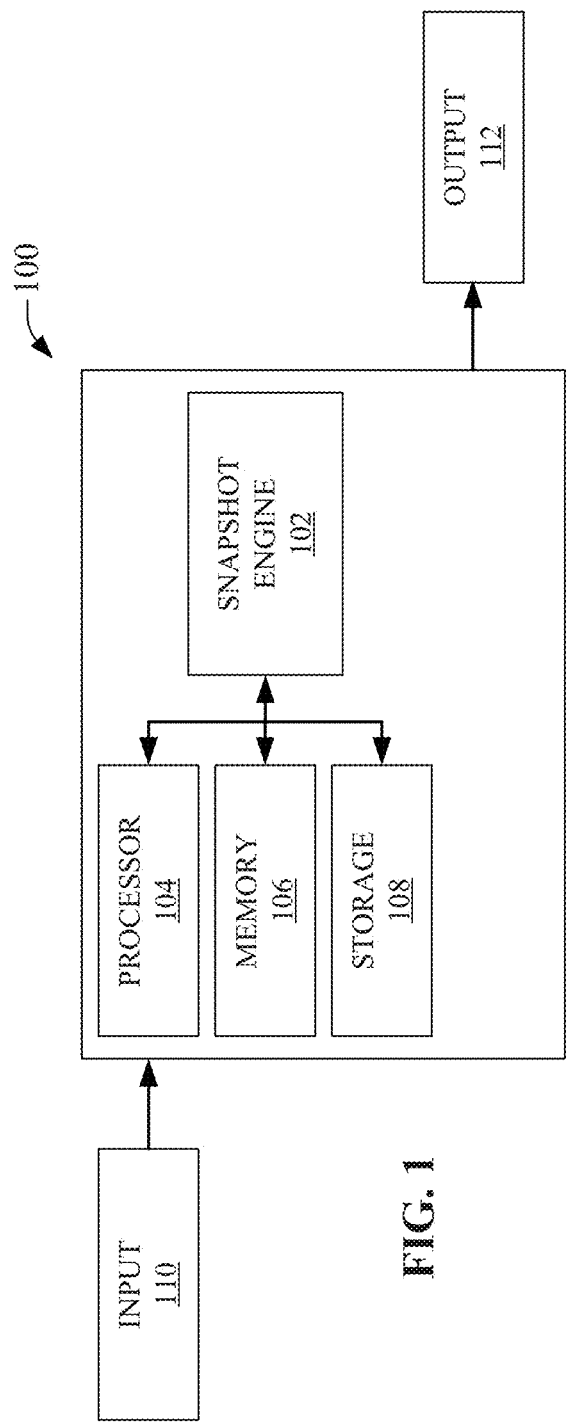
FIG. 1 illustrates a block diagram of a system that generates or creates trivial snapshots or binary state snapshots to simplify snapshot lifecycle management, in accordance with various example embodiments.

Aspects of the subject disclosure will now be described more fully hereinafter with reference to the accompanying drawings in which example embodiments are shown. In the following description, for purposes of explanation, numerous specific details are set forth in order to provide a thorough understanding of the various embodiments. However, the subject disclosure may be embodied in many different forms and should not be construed as limited to the example embodiments set forth herein.

The disclosed systems and methods, in accordance with various embodiments, provide a system, apparatus, or device comprising: a processor; and a memory that stores executable instructions that, when executed by the processor, facilitate performance of operations. The operations can comprise creating a trivial snapshot version of an enterprise storage array device based on a group of snapshot creation parameters; based on determining that the trivial snapshot version has been accessed within a defined expiration threshold value, marking the trivial snapshot version for deletion; and based on the marking, deleting the trivial snapshot version from the enterprise storage array device.

Additional operations can comprise determining that a link operation has been applied to the trivial snapshot version; determining that the link operation has completed; and in response to completion of the link operation, performing the marking the trivial snapshot version for the deletion.

In the context of the foregoing, the group of snapshot creation parameters can comprise the defined expiration threshold value; a state attribute, wherein the state attribute can be data representing an un-used state associated with the trivial snapshot version, and/or the state attribute can be data representative of a marked for deletion state associated with the trivial snapshot version as a result of the marking.

In accordance with further embodiments, the subject disclosure describes a method, comprising a series of acts that can include: determining, by a device comprising a processor, that a trivial snapshot instance representing a sub-grouping of storage devices, of a grouping of storage devices, included in an enterprise storage array device has not been accessed within a defined duration of time value; marking, by the device, the trivial snapshot instance for deletion from the enterprise storage array device based on an expiration of the defined duration of time value; and responsive to the marking, deleting, by the device, the trivial snapshot instance from the enterprise storage array device.

Further acts that can be performed can comprise associating, by the device, the trivial snapshot instance with an attribute representing the defined duration of time value; associating, by the device, the trivial snapshot instance with a state attribute representing a state value, wherein the state value represents an un-used state of the trivial snapshot instance, and/or wherein the state value represents a marked for deletion state of the trivial snapshot instance; determining, by the device, that a restore operation has been applied to the trivial snapshot instance; determining, by the device, that the restore operation applied to the trivial snapshot instance has completed; and/or in response to determining that the restore operation as applied to the trivial snapshot instance has completed, marking, by the device, the trivial snapshot instance for the deletion.

In accordance with still further embodiments, the subject disclosure describes a machine-readable storage medium, a computer-readable storage device, or non-transitory machine readable media comprising instructions that, in response to execution, cause a computing system (or a machine, apparatus, device, etc.) comprising at least one processor to perform operations. The operations can comprise: determining that a trivial snapshot instance representing a group of data included in an enterprise storage array device has not been accessed within a defined duration of time value; marking the trivial snapshot instance for deletion from the enterprise storage array device based on an expiration of the defined duration of time value; and deleting the trivial snapshot instance from the enterprise storage array device. Additional operations can include determining that a refresh operation has been applied to the trivial snapshot instance; determining that a refresh operation applied to the trivial snapshot instance has completed; and/or determining that a unlink operation has been performed on the trivial snapshot instance.

Generally normal snapshots, in contrast to trivial snapshots as set forth in this disclosure, are generated or created without any properties in regard to, for example, a duration of time attribute for which the normal snapshot is to be in existence. Thus for instance, a normal snapshot, once created, can have an infinite lifespan; the normal snapshot can be in existence until a storage administrator (or storage administrator device) takes an affirmative action to facilitate the removal (deletion) of the created normal snapshot.

Management of the lifecycles of a multitude of disparate normal snapshots can be a time intensive task. Typically, storage administrators will manage the lifecycle of normal snapshots by, creating/generating a normal snapshot, enabling access to the created/generated normal snapshot, restricting the number of normal snapshots in existence at any given existence in time, and deleting the generated/created normal snapshots. Missing or omitting one or more of these complex normal snapshot lifecycle tasks, by the storage administrator, can result in a multitude of stale normal snapshots in the enterprise storage arrays; resulting in wasted unused space, and significant degradations in the performance of the enterprise storage arrays.

Analysis of snapshot lifecycle management data reveals that nearly 50% of created normal snapshots in the enterprise storage array are generally to: refresh test/development copies of data; run analytics on data comprising the created normal snapshot; refresh temporary backups of test/development copies (e.g. before changes are made to the data); and/or temporary backups of analytics data (e.g. before running analytics on the data). These normal snapshots typically occupy nearly 40% to 50% of the overall allocated snapshot space of an enterprise storage array.

Further analysis of snapshot lifecycle management data has indicated that generally normal snapshot have a useful/valid lifespan of about 2 days (e.g., 48 hours) and typically are only used once during their existence (or life cycle).

Also, normal snapshots to refresh copies may not be required once the refresh completes, the normal snapshot is only used once. In regard to snapshots generated for purposes of test/development environment backup, these snapshots may be used to revert changes back to the original, or may not be needed once testing has been completed. Thus, enabling feature attribute tuples and/or one or more option fields to be associated with the created normal snapshot and to denote these as "trivial snapshots" or "binary state snapshots" in enterprise storage arrays would be significantly beneficial to simplify snapshot lifecycle management.

With reference now to the Figures, FIG. 1 depicts a system 100 that provides for generating and/or creating of trivial snapshots or binary state snapshots to simplify snapshot lifecycle management, in accordance with various example embodiments. System 100 for purposes of illustration, can be any type of mechanism, machine, device, facility, apparatus, and/or instrument that includes a processor and/or is capable of effective and/or operative communication with a wired and/or wireless network topology. Mechanisms, machines, apparatuses, devices, facilities, and/or instruments that can comprise system 100 can include tablet computing devices, handheld devices, server class computing devices, machines, and/or databases, laptop computers, notebook computers, desktop computers, cell phones, smart phones, consumer appliances and/or instrumentation, industrial devices and/or components, hand-held devices, personal digital assistants, multimedia Internet enabled phones, multimedia players, and the like.

System 100 can comprise snapshot engine 102 that can be in operative communication with processor 104, memory 106, and storage 108. Snapshot engine 102 can be in communication with processor 104 for facilitating operation of computer-executable instructions or machine-executable instructions and/or components by snapshot engine 102, memory 106, for storing data and/or computer-executable instructions and/or machine-executable instructions and/or components, and storage 108 for providing longer term storage of data and/or machine-readable instructions and/or computer-readable instructions. Additionally, system 100 can also receive input 110 for use, manipulation, and/or transformation by snapshot engine 102 to produce one or more useful, concrete, and tangible results, and/or transform one or more articles to different states or things. Further, system 100 can also generate and output the useful, concrete, and tangible results and/or the transformed one or more articles as output 112.

Snapshot engine 102, in accordance with one or more embodiments, can generate and/or create trivial snapshots of enterprise storage arrays that can be associated with one or more groups of properties (e.g., option fields, attribute tuples, etc.). In accordance with various aspects, the one or more groups of properties can include a duration property (lifetime to deletion or lifespan till deletion) that can prescribe a defined or definable duration for the trivial snapshot is to be in existence (e.g., a period during which a trivial snapshot can be used and/or accessed). Generally, the duration property can be set to one day (e.g., 24 hours), however, as will be appreciated by those of ordinary skill, longer durations and/or shorter durations can also be specified or defined. For example, a trivial snapshot formed from groupings (or a sub grouping) of enterprise storage array devices can have associated with the created trivial snapshot a duration property that can indicate a lifespan after which the trivial snapshot can be marked (or flagged) for deletion, and can eventually be deleted from the system (e.g., system 100). Once the duration property has expired (e.g., as determined and/or measured by one or more system clock component or system clock device) snapshot engine 102 can facilitate cleanup and/or deletion of the marked or flagged trivial snapshot, restoring the grouping of devices which can have been used to form the trivial snapshot from the various groupings and/or sub-groupings of storage devices that can comprise the created/generated trivial snapshot to their one or more earlier state(s). Snapshot engine 102, on facilitating cleanup and/or deletion of the marked of flagged trivial snapshots and/or restoration of the grouping of devices which can have comprised the trivial snapshot from the various disparate groupings and/or sub-groupings of storage devices to their earlier states, can reduce the storage administrators burden in managing snapshots in the context of the enterprise storage arrays.

In regard to the expiration of the defined or definable duration of time in connection with the duration property; time can generally can start to run at the creation or generation of the trivial snapshot. Thus, for example, when a first trivial snapshot is created at 13:00 hours, Dec. 4, 2019 (e.g., 1:00 pm Dec. 4, 2019) with an associated duration property set as 24 hours (e.g., 1 day), the first trivial snapshot can be deleted from the system at 13:00 hours, Dec. 5, 2019 (e.g., 12:59 pm Dec. 4, 2019). Similarly, should a second trivial snapshot be formed at 0800 hours, Dec. 25, 2019 (e.g., 8 am Dec. 25, 2019) with an associated duration property set as 4 hours, the second trivial snapshot can be deleted from the system at 1159 hours, Dec. 25, 2019.

Snapshot engine 102, in addition to facilitating creation of trivial snapshots from groupings of groupings and/or sub-groupings of storage devices that can form an enterprise storage arrays and associating groups of properties to the created and/or generated trivial snapshots, can also determine whether or not a generated or created trivial snapshot has been restored. Where snapshot engine 102, in one or more embodiments, determines that a created or generated trivial snapshot has been restored, snapshot engine 102, on completion of the restore operation, can mark the trivial snapshot for deletion. In this regard, snapshot engine 102 can associate an option field (e.g., a bit flag, . . . ) with the trivial snapshot to indicate that the trivial snapshot at issue should be deleted. Typically, when snapshot engine 102 marks a trivial snapshot for deletion, the deletion of the trivial snapshot can be facilitated and/or implemented immediately (e.g., as soon as snapshot engine 102 marks the trivial snapshot as being a candidate for removal and/or deletion).

In a similar manner, where snapshot engine 102 determines that a created or generated trivial snapshot has been linked, snapshot engine 102, in accordance with various example embodiments, can mark the trivial snapshot for deletion once an unlink operation unlinking the trivial snapshot has been effectuated and has completed. Once again, snapshot engine 102 can associate an option field with the trivial snapshot to indicate that the trivial snapshot at issue should be deleted. Generally, when snapshot engine 102 marks the trivial snapshot for deletion, the deletion of the trivial snapshot can be facilitated and/or implemented immediately. However, as will be appreciated by those having ordinary skill in the art, deletion of the trivial snapshot can be facilitated, by snapshot engine 102, in accordance with a determined or determinable schedule. For instance, snapshot engine 102 can facilitate deletion of one or more marked (e.g., marked for deletion) trivial snapshots after a defined or definable value of computer processing cycles, or in this instance, once an unlink operation has been received and execution of the unlink operation has completed.

In instances where snapshot engine 102 determines that a refresh operation has been effectuated with regard to a created and/or generated trivial snapshot, snapshot engine 102 can associate an attribute tuple with the trivial snapshot at issue to indicate that the trivial snapshot should be deleted. When snapshot engine 102 marks the trivial snapshot for deletion, the deletion of the trivial snapshot can be facilitated and/or effectuated immediately (e.g., once the refresh operation has completed). Nevertheless, as has been noted above, deletion of the trivial snapshot can be facilitated, by snapshot engine 102, in accordance with a determined or determinable schedule. Thus, in some embodiments, deletion or removal of a trivial snapshot can be facilitated subsequent to the expiration of a defined or determinable time period.

In one or more embodiments, when snapshot engine 102 forms or creates a trivial snapshot and associates a duration tuple (e.g., an attribute that indicates a duration during which the created trivial snapshot is to have an existence, and is to be accessible and manipulable by users and/or processes) with the formed trivial snapshot, the created trivial snapshot can be created as being for single use cases. Single use cases can include cases where trivial snapshots are created for testing and/or development purposes (e.g., where "live" data [or online production data] comprising the enterprise storage array cannot be used for development and testing purposes), and/or where trivial snapshots are created purposes of data analysis and/or data analytics. In these single use cases, these trivial snapshots can be marked for deletion immediately and once the created trivial snapshot has been accessed and/or used for its intended purpose.

Since trivial snapshots are typically not so important for purposes of restoration and/or recovery (e.g., trivial snapshots are typically copies of data extant in an online production environment at a particular instant in time), there is generally no requirement that the created trivial snapshots be subjected to backup, since the trivial snapshot generally becomes "stale" in relation to the data comprising the online production environment at the moment that the trivial snapshot is created. Accordingly, selection of groups of storage devices that can be formed to comprise trivial snapshot instances can be drawn from devices that have been designated with low service level objectives (SLOs). Typically, storage devices that can have been assigned to pools or groupings of storage devices with low SLOs can include solid state drive (SSD) storage devices. SSD storage devices, in the context of enterprise storage arrays, are typically rated, based on priority and/or required input/output (I/O) characteristics as storage devices with the lowest SLOs. Other storage devices that can also be assigned to pools or groups of storage devices that can be utilized for the purpose of trivial snapshot creation can be flash drive storage devices. Flash drive storage devices are typically faster in I/O access speeds than SSD devices and thus can be ranked or classified with higher SLOs (e.g., a medium or moderate SLO). Still additional storage devices that can also be assigned to pools or groupings of storage devices and that can be used for the purpose of trivial snapshot creation can be Non-Volatile Memory Express (NVMe) storage devices or storage device that use the Non-Volatile Memory Host Controller Interface Specification (NVMHCIS)—an open logical device interface technical standard for accessing non-volatile storage media attached via a Peripheral Component Interconnect Express (PCIe) bus. NVMe storage devices are faster in terms of I/O access speeds than both SSD storage devices and flash memory storage devices and as such can be classified as devices with the highest SLOs. As will be appreciated by those of ordinary skill in the art while NVMe storage device can be used for the purposes of trivial snapshot creation, in practice, use of such extremely fast devices for the formation of trivial snapshot instances is unlikely. Thus, for most applications the storage devices on which trivial snapshots can be instantiated will typically be selected from groups of devices that have been classified as having low SLOs and/or medium or moderate SLOs (e.g., SSD storage devices and/or flash drive storage devices).

In cases where snapshot engine 102 determines that a critical storage demand has occurred and cleanup required for the enterprise storage array to reclaim storage, snapshot engine 102 can provide functionalities and/or facilities to effectuate reclamation of storage from instantiated trivial snapshots. In accordance with various embodiments, snapshot engine 102 can facilitate the display of a user interface (UI) that a system administrator can use to reclaim storage space being used to facilitate the existence of one or more trivial snapshots. In additional and/or alternative embodiments, snapshot engine 102 using, for example, artificial intelligence (AI) functionalities, machine learning facilities, data mining processes, data analytics processes, and/or data synthesis processes, and the like, can determine which trivial snapshot instances should be deleted in order to reclaim storage space. For example, in accordance with an aspect snapshot engine 102 can use a probabilistic cost/benefit analysis to determine whether the cost of maintaining a trivial snapshot instance on a group of storage devices outweighs the benefit of maintaining the trivial snapshot instance on the group of storage devices, in which case snapshot engine 102 can facilitate deletion of the trivial snapshot instance from the group of storage devices. In a further example, snapshot engine 102 can use a group of pertinent past events (that can, for instance, have been obtained through the facilities or functionalities of one or more data mining device/component and/or data analytics device/components (not shown)) to make inferences in regard to which trivial snapshots that should be marked for deletion. The inferences, in accordance with various embodiments, can be determined as a function of synthesizing a first group of pertinent past events with a second group of pertinent past events to arrive at a grouping of possible and/or appropriate actions that snapshot engine 102 can utilize in determining which trivial snapshot should be marked for subsequent deletion, and thereafter facilitate removal of the trivial snapshot from the enterprise storage array. In accordance with other additional and/or alternative embodiments, inferences can be based on the use of collaborative filtering processes, use of Bayesian belief networks, neural networks, and the like.

In accordance with various embodiments, snapshot engine 102 can create trivial snapshots that can be user specific, where in access to the trivial snapshot is restricted to one or more groupings of users. For instance, trivial snapshots created for purposes of test and/or development purposes, and for purposes of data analytics do not typically need to provide for general user access; access to trivial snapshot for the foregoing purposes (in contrast to normal snapshots) need only be provided to a curtailed group of users (e.g., specific users who are to be immediately using the created trivial snapshot need to be given access to that particular created trivial snapshot; identified or identifiable users [e.g., based on defined or definable identification criteria] who are to be immediately using the generated trivial snapshot created for development purposes need only to be provided access to that specific trivial snapshot; and/or users solely restricted, as a function of one or more identified or identifiable clustering characteristic, can be accorded access to a group of trivial snapshots that can have been formed for the purposes of data analytics).

Figure 2:
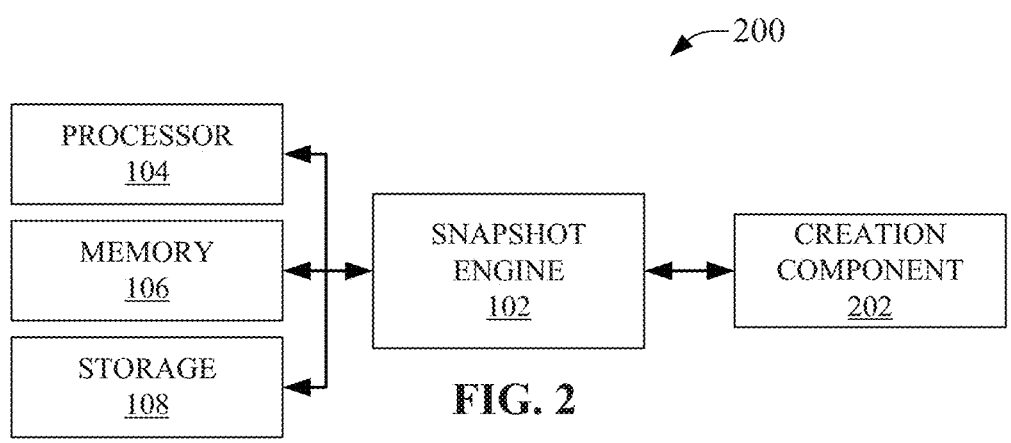
FIG. 2 illustrates an additional system that generates or creates trivial snapshots or binary state snapshots to simplify snapshot lifecycle management, in accordance with various example embodiments.

FIG. 2 provides further depiction of system 100, now depicted as system 200, that provides for generating and/or creating trivial snapshots or binary state snapshots to simplify snapshot lifecycle management, in accordance with various example embodiments. System 200 can comprise creation component 202 that in collaboration with snapshot engine 102, processor 104, memory 106, and storage 108 can create a version of a trivial snapshot in accordance with the disclosed subject matter. As has been noted above, trivial snapshot versions or trivial snapshot instance of an enterprise storage array can be associated with one or more grouping of properties. Creation component 202 can create a trivial snapshot version or a trivial snapshot instance of a grouping of data that can be included in the enterprise storage array. Creation component 202 can then associate one or more groups of properties to the created trivial snapshot version or trivial snapshot instance. The one or more groups of properties can comprise, for instance, option fields, attribute tuples, etc. that can indicate a defined or definable time period during which the created trivial snapshot version or the created trivial snapshot instance is to have an existence. In this regard, a duration property, such as a lifetime to deletion or lifetime till deletion property can be used. In regard to the created trivial snapshot version or the created trivial snapshot instance, the created trivial snapshot can have two valid states. The first valid state can be a state of "non-use"; and the second valid state can be a state "marked for deletion," e.g., when a trivial snapshot is in the first state (the state of "non-use") the trivial snapshot has not as yet been accessed are utilized, in which case the trivial snapshot will be deleted once the defined or definable time period as expired; when a trivial snapshot is in the second state ("marked for deletion") the trivial snapshot in this instance has been accessed and/or is in use and will be marked for deletion once access to the trivial snapshot version has concluded.

Figure 3:
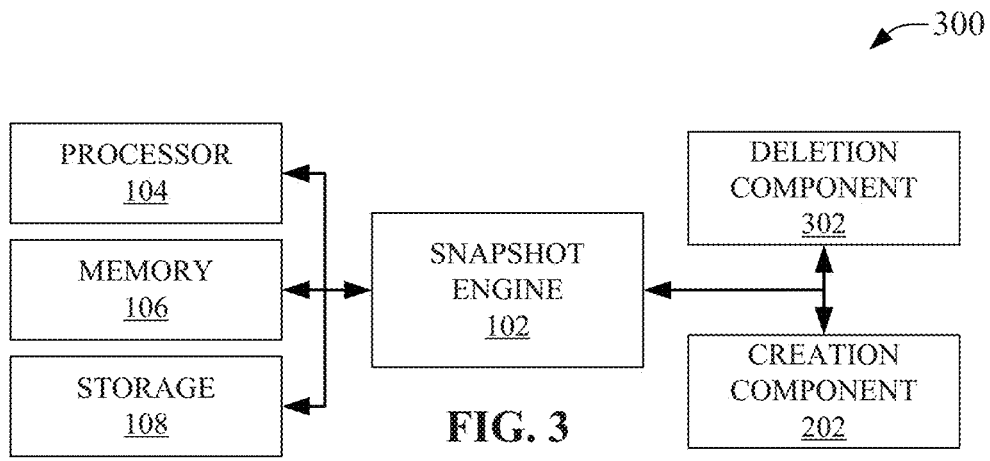
FIG. 3 illustrates yet a further system that generates or creates trivial snapshots or binary state snapshots to simplify snapshot lifecycle management, in accordance with various example embodiments.

FIG. 3 provides an additional depiction of system 200, now depicted as system 300, that provides for generating and/or creating trivial snapshots or binary state snapshots to simplify snapshot lifecycle management, in accordance with various example embodiments. As illustrated, system 300 can comprise deletion component 302 that in conjunction with creation component 202 and in collaboration with snapshot engine 102, processor 104, memory 106, and storage 108 can delete one or more instantiation of trivial snapshots in accordance with the disclosed subject matter. Deletion component 302 can delete instantiations of trivial snapshots based at least upon indicia that can have been associated with the trivial snapshot instantiation by creation component 202 when the trivial snapshot instantiation was create. The indicia can comprise defined or definable time durations as to how long the created trivial snapshot should be in existence. The indicia can also comprise state data representing whether the trivial snapshot has been marked for deletion, and/or whether or not the trivial snap shot has been accessed since creation of the trivial snapshot. Based on at least one or more of the foregoing indicia that can have been associated with the created trivial snapshot, deletion component 302 can facilitate deletion of the trivial snapshot, restoring the groupings and/or sub-groupings of storage devices that can have been used to create or generate the trivial snapshot instance.

Figure 4:
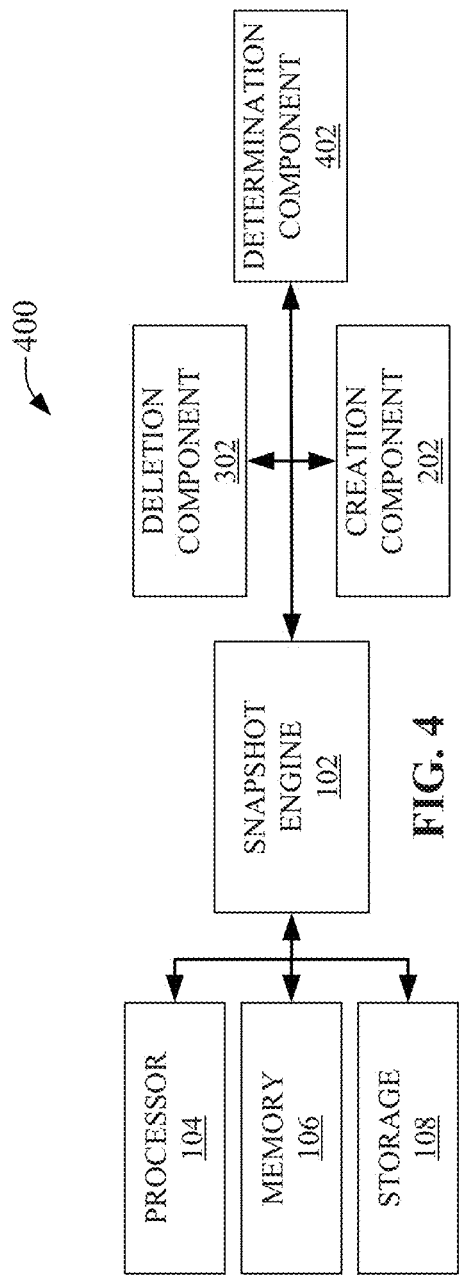
FIG. 4 depicts a further system that generates or creates trivial snapshots or binary state snapshots to simplify snapshot lifecycle management, in accordance with various example embodiments.

FIG. 4 provides further illustration of system 300, now depicted as system 400, that provides for generating and/or creating trivial snapshots or binary state snapshots to simplify snapshot lifecycle management, in accordance with various example embodiments. As depicted system 400 can comprise determination component 402, that in conjunction with deletion component 302, creation component 202, snapshot engine 102, processor 104, memory 106, and/or storage 108, can determine whether a created or generated trivial snapshot has been restored. Determination component 402 can determine whether or not the created or generated trivial snapshot has been restored based upon an option field associated with the generated trivial snapshot. As has been noted above, once a trivial snapshot has been restored, on completion of the restore operation, the trivial snapshot at issue can be marked for deletion and thereafter, snapshot engine 102 can facilitate the deletion of the trivial snapshot.

Additionally, determination component 402 can determine whether or not the created or generated trivial snapshot has been linked. Once again, determination component 402 can determine whether or not the created or generated trivial snapshot has been linked as a function of one or more option fields that can have been associated with the created/generated trivial snapshot. Once determination component 402 determines that the trivial snapshot has been linked, on completion of the link operation and/or on completion of an unlink operation, the trivial snapshot at issue can be marked for deletion and thereafter, snapshot engine 102 can facilitate the deletion of the trivial snapshot from the enterprise storage array.

Further, determination component 402 can determine whether or not a refresh operation has been applied to the created or generated trivial snapshot. Determination component 402 can determine whether or not a refresh operation has been applied to the created or generated trivial snapshot in question based at least in part on option fields that can have been associated with the created/generated trivial snapshot. Determination component 402, on determining that the trivial snapshot has been refreshed (or is in the process of being refreshed) can mark the trivial snapshot for subsequent deletion once the refresh operation has completed. Once the trivial snapshot has been marked for deletion, snapshot engine 102 can facilitate the deletion of the snapshot from the enterprise storage array.

As has been noted earlier, created or generated trivial snapshots are generally created for purposes of testing and development of processes that are to be implemented into a "live" or "on-line" systems (such as a banking database(s)) at a future date. Thus, trivial snapshots are typically not so important for purposes of restoration and/or recovery (e.g., trivial snapshots are typically copies of data extant in the online production environment at a particular instant in time), there is generally no requirement that the created trivial snapshots be subjected to backup, since the trivial snapshot generally becomes "stale" in relation to the data comprising the online production environment at the moment that the trivial snapshot is created. Accordingly, selection of groups of storage devices that can be formed to comprise this trivial snapshot instances can be drawn from devices that have been designated with low service level objectives (SLOs).

Figure 5:
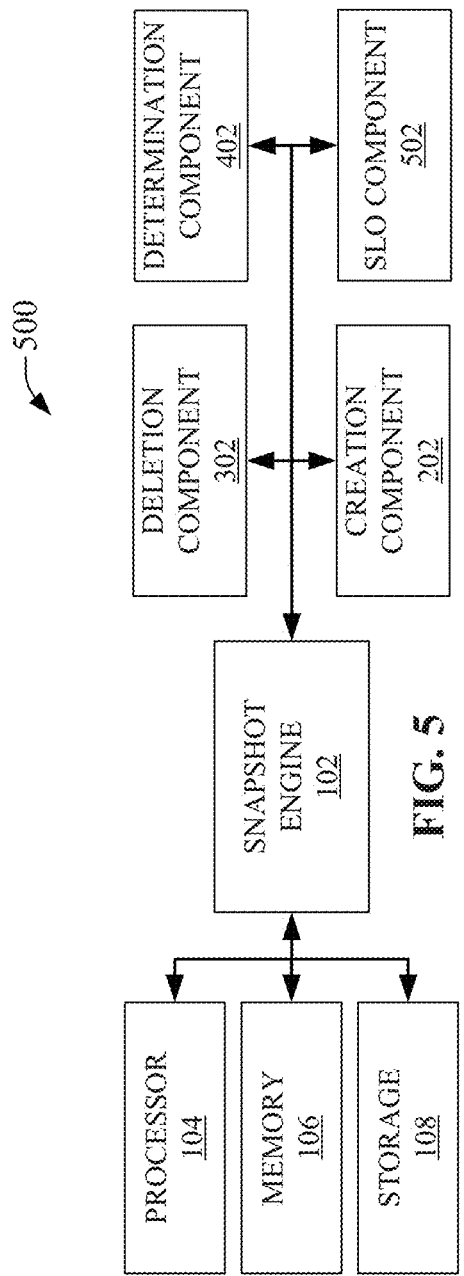
FIG. 5 illustrates another system that generates or creates trivial snapshots or binary state snapshots to simplify snapshot lifecycle management, in accordance with various example embodiments.

Accordingly, SLO component 502, as depicted in FIG. 5, in collaboration with determination component 402, deletion component 302, creation component 202, snapshot engine 102, processor 104, memory 106, and/or storage 108 can select groups of sub-groupings of storage devices that can be formed to comprise trivial snapshot instances based on one or more SLOs. Typically, the storage devices that SLO component 502 determines and draws upon for the purposes of trivial snapshot creation/generation are generally storage devices with the lowest SLOs, such as solid state drive (SSD) storage devices. As has been noted above, SSD storage devices, in the context of enterprise storage arrays, are typically rated, based at least in part on priority and/or required input/output characteristics as devices with the lowest SLOs. Other storage devices that can also be selected and assigned for the purposes of trivial snapshot creation can include devices that are faster than SSD storage devices such as flash drive storage devices. Flash drive storage devices are typically faster in relation to input and/or output access speeds in contrast to solid state drive storage devices. It should be noted that the subject disclosure is not limited to just selecting from storage device groupings associated with the lowest and/or middling SLOs. In accordance with various embodiments, SLO component 502 can also select storage device that can be associated with the highest SLOs. These storage devices can comprise Non-Volatile Memory Express (NVMe) storage devices that can use the Non-Volatile Memory Host Controller Interface Specification technical standard. NVMe storage devices are faster in terms of I/O access speed then both SSD storage devices and flash memory storage devices.

Figure 6:
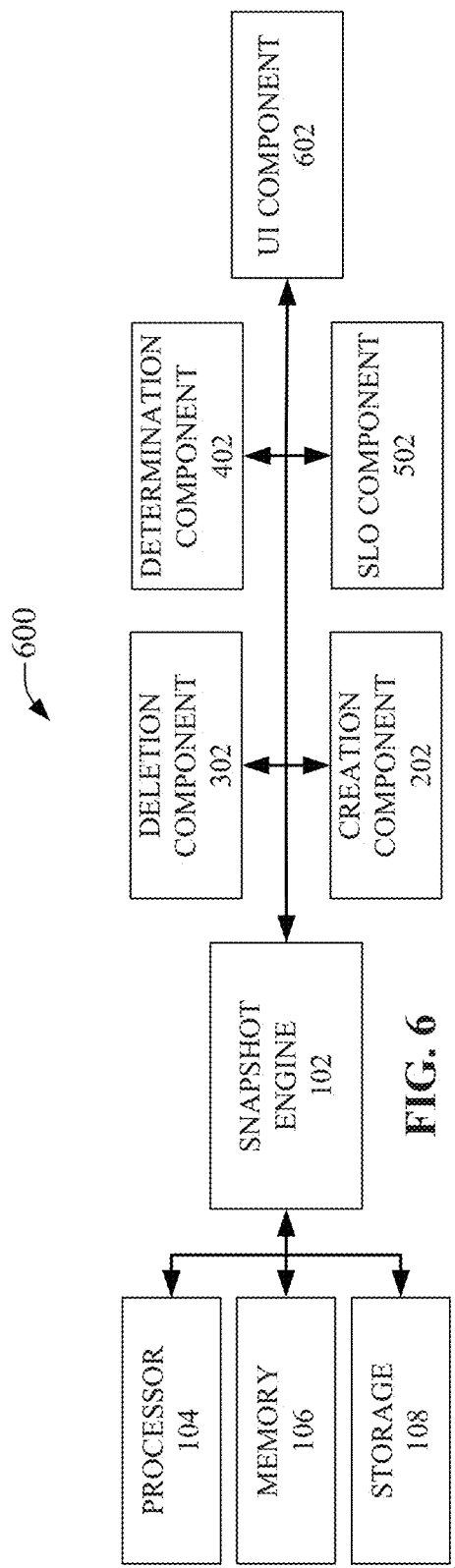
FIG. 6 illustrates a yet another system that generates or creates trivial snapshots or binary state snapshots to simplify snapshot lifecycle management, in accordance with various example embodiments.

FIG. 6 provides an additional depiction of system 500, now depicted as system 600, that provides for generating and/or creating trivial snapshots or binary state snapshots to simplify snapshot lifecycle management, in accordance with various example embodiments. As depicted system 600 comprises UI component 602 that together with SLO component 502, determination component 402, deletion component 302, creation component 202, snapshot engine 102, processor 104, memory 106, and/or storage 108, can facilitate generation and/or display of one or more user interface (e.g., command line user interface and/or graphical user interface). The generated user interface, at times when there are critical storage demands associated with the enterprise storage array, can allow a system administrator using the user interface generated by UI component 602 to reclaim storage space being used to facilitate the existence of one or more trivial snapshot instance. UI component 602 can draw upon the facilities and functionalities provided by one or more artificial intelligence functionalities, machine learning facilities, data mining processes, data analytics processes, and/or data synthesis processes, and the like to determine (or suggest to the system administrator) which trivial snapshot instances should be marked for deletion in order to reclaim storage space in order to overcome or ameliorate the critical storage demand.

Figure 7:
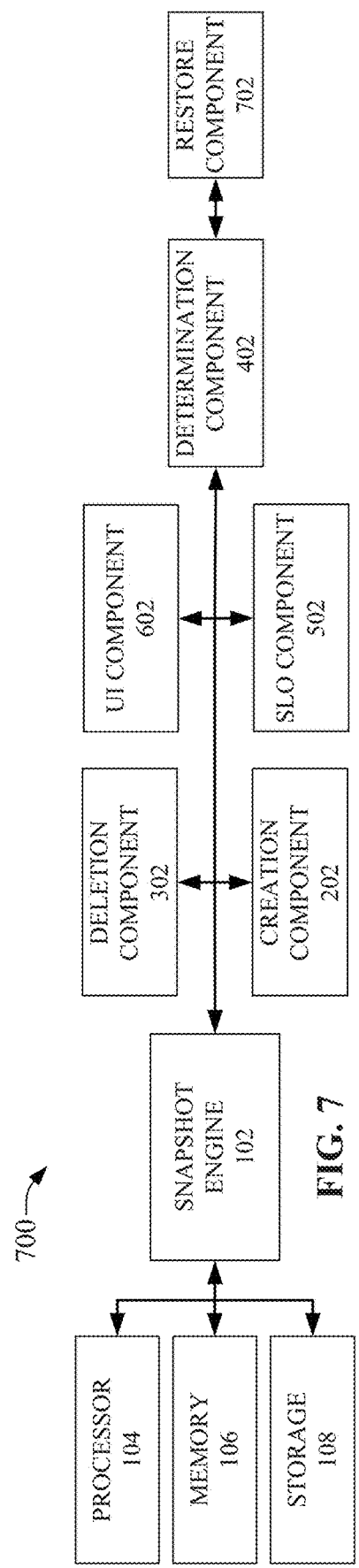
FIG. 7 depicts a further system that generates or creates trivial snapshots or binary state snapshots to simplify snapshot lifecycle management, in accordance with various example embodiments.

FIG. 7 provides an additional illustration of system 600, now depicted as system 700, that provides for generating and/or creating trivial snapshots or binary state snapshots to simplify snapshot lifecycle management, in accordance with various example embodiments. As illustrated determination component 402 can comprise restore component 702 that, in accordance with embodiments, can be used to determine whether or not the created or generated trivial snapshot has been restored based upon an option field associated with the generated trivial snapshot. As has been noted above, once a trivial snapshot has been restored, on completion of the restore operation, the trivial snapshot at issue can be marked for deletion and thereafter, snapshot engine 102 can facilitate the deletion of the trivial snapshot.

Figure 8:
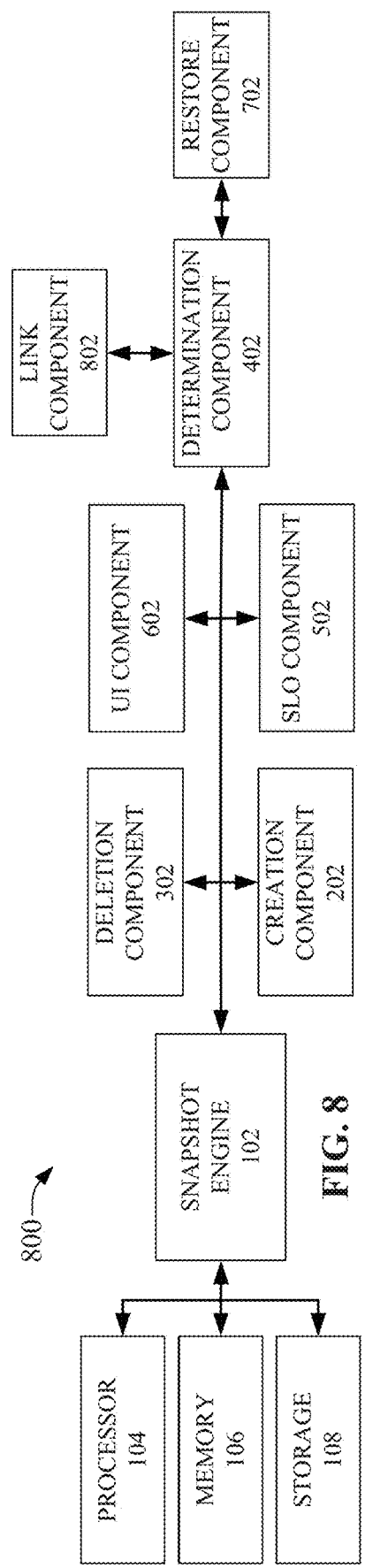
FIG. 8 illustrated another system that generates or creates trivial snapshots or binary state snapshots to simplify snapshot lifecycle management, in accordance with various example embodiments.

FIG. 8 provides a further illustration of system 700, now depicted as system 800, that provides for generating and/or creating trivial snapshots or binary state snapshots to simplify snapshot lifecycle management, in accordance with various example embodiments. As depicted determination component 402 can also comprise link component 802. Link component 802, together with determination component 402, can determine whether or not the created or generated trivial snapshot has been linked. Once again, link component 802 can determine whether or not the created or generated trivial snapshot has been linked (or unlinked) as a function of one or more option fields that can have been associated with the created/generated trivial snapshot. Once link component 802 determines that the trivial snapshot has been linked (or unlinked), on completion of the link operation and/or on completion of an unlink operation, the trivial snapshot at issue can be marked for deletion and thereafter, snapshot engine 102 can facilitate the deletion of the trivial snapshot from the enterprise storage array.

Figure 9:
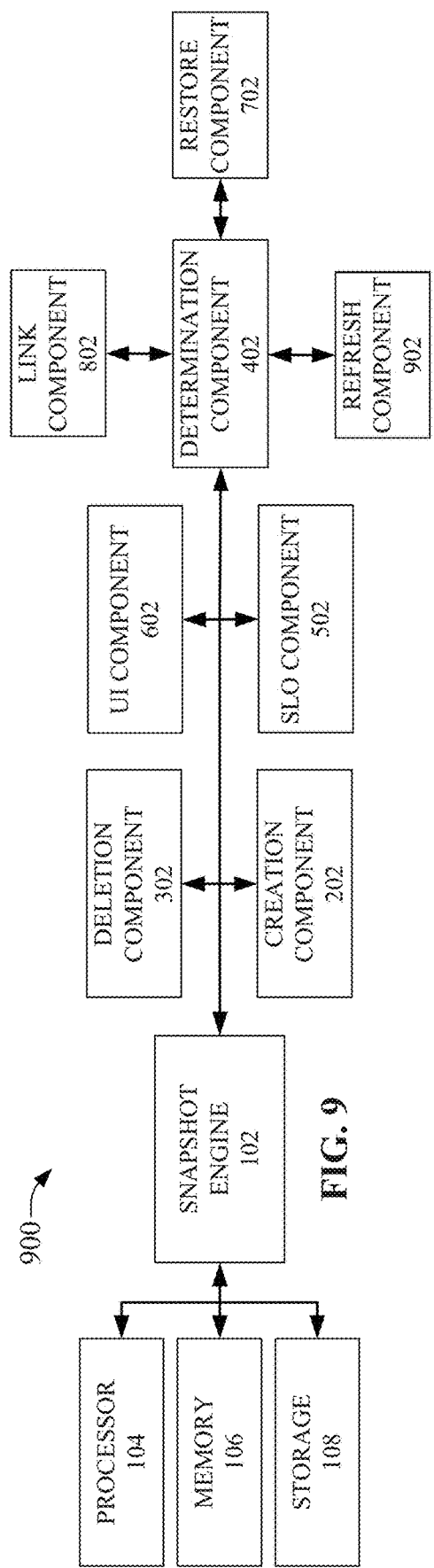
FIG. 9 depicts a further system that generates or creates trivial snapshots or binary state snapshots to simplify snapshot lifecycle management, in accordance with various example embodiments.

FIG. 9 provides an additional illustration of system 800, now depicted as system 900, that provides for generating and/or creating trivial snapshots or binary state snapshots to simplify snapshot lifecycle management, in accordance with various example embodiments. System 900 can include refresh component 902 that can operate in collaboration with determination component 902. Refresh component 902 determine whether or not a refresh operation has been applied to a created or generated trivial snapshot. Refresh component 902 can determine whether or not a refresh operation has been applied to the created or generated trivial snapshot in question as a function of option fields that can have been associated with the created/generated trivial snapshot. Refresh component 902, on determining that the trivial snapshot has been refreshed (or is in the process of being refreshed) can mark the trivial snapshot for subsequent deletion once the refresh operation has completed. As has been noted before, once the trivial snapshot has been marked for deletion, snapshot engine 102 can facilitate the deletion of the snapshot from the enterprise storage array.

As used herein, the term "cloud" can refer to a cluster, data storage cluster, etc. comprising a group of nodes, data storage nodes, etc., e.g., comprising a group of network servers (e.g., comprising storage devices, disk drives, etc.), within a distributed, e.g., globally distributed, storage system—the group of storage nodes being communicatively and/or operatively coupled to each other, and hosting a group of applications utilized for servicing user requests. In general, the storage nodes can communicate with user devices via wired and/or wireless communication network(s) to provide access to services that are based in the cloud and not stored locally, e.g., on a user device. A typical cloud-computing environment can include multiple layers, aggregated together, which interact with each other to provide resources for end-users.

The foregoing scheme for generating and/or creating trivial snapshots or binary state snapshots to simplify snapshot lifecycle management can be employed by a object storage system, such as an Elastic Cloud Storage (ECS) system, and can be utilized in storage environment(s) corresponding to embodiments disclosed herein. For example, FIG. 11 illustrates an ECS storage system comprising a cloud-based object storage appliance in which corresponding storage control software comprising, e.g., ECS data client(s), ECS management client(s), storage service(s), etc. and storage media, e.g., physical magnetic disk media, storage devices, etc. of respective ECS nodes of an ECS cluster, are combined as an integrated system with no access to the storage media other than through the ECS system.

Figure 11:
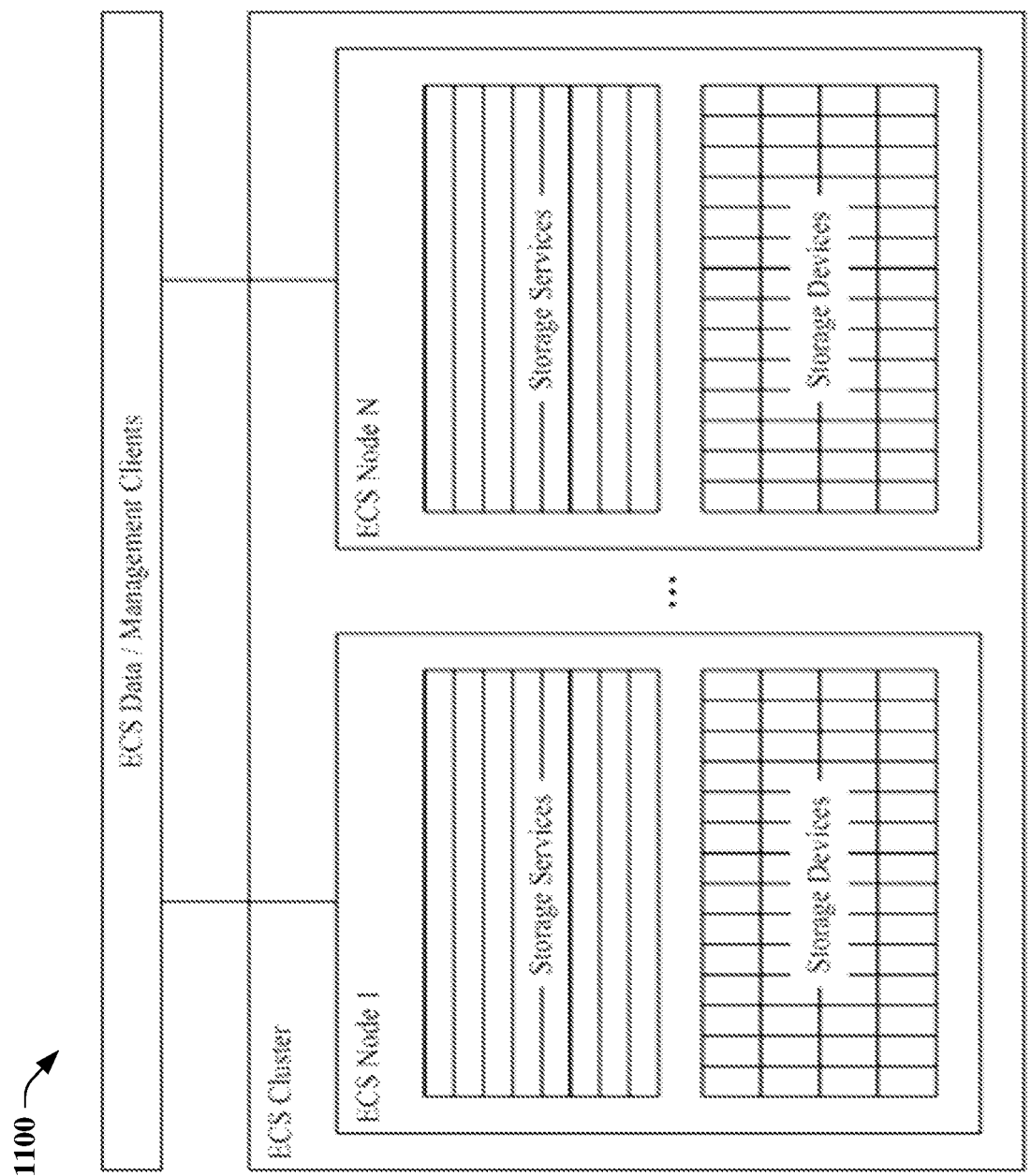
FIG. 11 illustrates an elastic cloud storage (ECS) system, in accordance with various example embodiments.

In this regard, as illustrated by FIG. 11, an ECS cluster comprises multiple nodes, storage nodes, ECS nodes, etc. Each node is associated with storage devices, e.g. hard drives, physical disk drives, storage media, etc. In embodiment(s), an ECS node executing on a hardware appliance can be communicatively coupled, connected, cabled to, etc., e.g., 15 to 120 storage devices. Further, each ECS node can execute one or more services for performing data storage operations described herein.

The ECS system is an append-only virtual storage platform that protects content from being erased or overwritten for a specified retention period. In particular, the ECS system does not employ traditional data protection schemes like mirroring or parity protection. Instead, the ECS system utilizes erasure coding for data protection, wherein data, a portion of the data, e.g., a data chunk, is broken into fragments, and expanded and encoded with redundant data pieces and then stored across a set of different locations or storage media, e.g., across different storage nodes.

The ECS system can support storage, manipulation, and/or analysis of unstructured data on a massive scale on commodity hardware. As an example, the ECS can support mobile, cloud, big data, and/or social networking applications. In another example, the ECS can be deployed as a turnkey storage appliance, or as a software product that can be installed on a set of qualified commodity servers and disks, e.g., within a node, data storage node, etc. of a cluster, data storage cluster, etc. In this regard, the ECS can comprise a cloud platform that comprises at least the following features: (i) lower cost than public clouds; (ii) unmatched combination of storage efficiency and data access; (iii) anywhere read/write access with strong consistency that simplifies application development; (iv) no single point of failure to increase availability and performance; (v) universal accessibility that eliminates storage silos and inefficient extract, transform, load (ETL)/data movement processes; etc.

In embodiment(s), the cloud-based data storage system can comprise an object storage system, e.g., a file system comprising, but not limited to comprising, a Dell EMC® Isilon file storage system. As illustrated by FIG. 1, a snapshot engine (102) can be a part of a storage service layer (e.g., storage services illustrated by FIG. 11) of the cloud-based data storage system, and can handle data availability and protection against data corruption, hardware failure(s,) and/or data center disasters. In embodiment(s), the snapshot engine 102 can be a distributed, shared service, storage service, etc. that can run on each node, ECS node, etc., As an example, the storage engine can write all object-related data, e.g., user data, metadata, object location data, etc. to logical containers of contiguous disk space, e.g., such containers comprising a group of blocks of fixed size (e.g., 128 MB) known as chunks. Data is stored in the chunks and the chunks can be shared, e.g., one chunk can comprise data fragments of different user objects. Chunk content is modified in append-only mode, e.g., such content being protected from being erased or overwritten for a specified retention period. When a chunk becomes full enough, it is sealed, closed, etc. In this regard, content of a sealed, closed, etc. chunk is immutable, e.g., read-only, and after the chunk is closed, the storage engine performs erasure-coding on the chunk.

Figure 10:
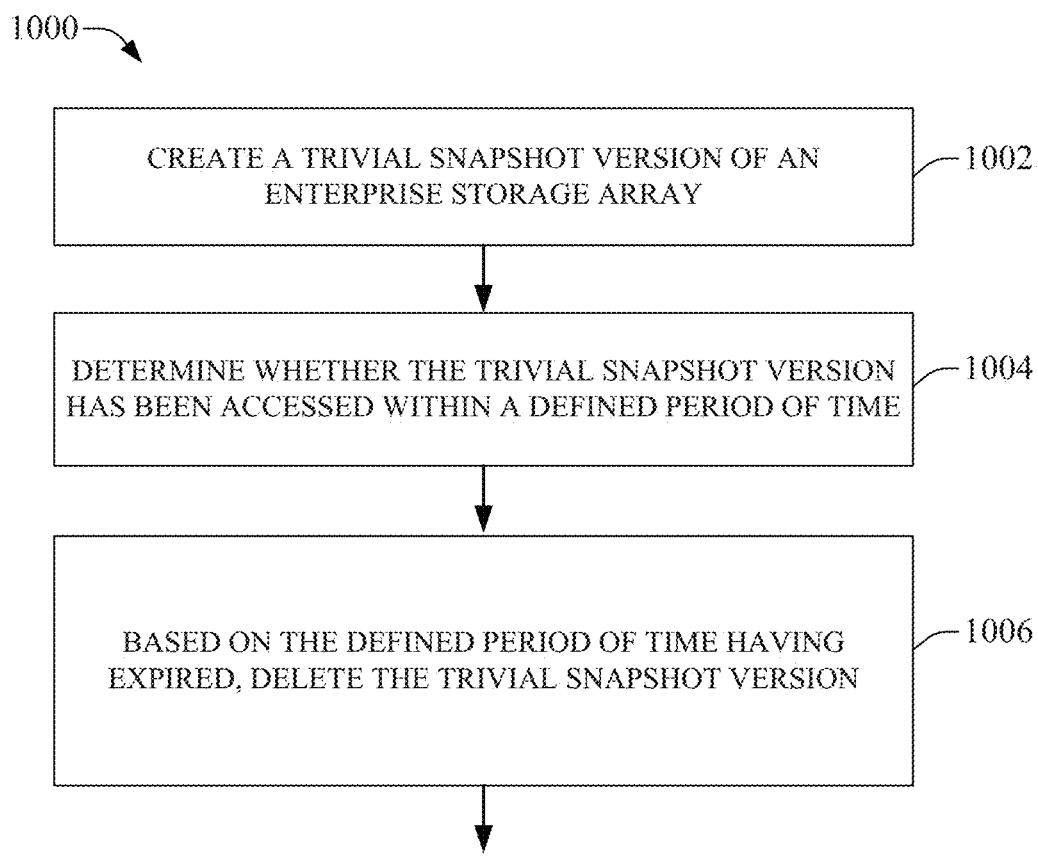
FIG. 10 illustrates a flow chart of a method for generating or creating trivial snapshots or binary state snapshots to simplify snapshot lifecycle management, in accordance with various example embodiments.

FIG. 10 illustrates a methodology for performing operations corresponding to a system 100, in accordance with various example embodiments. For simplicity of explanation, the methodologies are depicted and described as a series of acts. It is to be understood and appreciated that various embodiments disclosed herein are not limited by the acts illustrated and/or by the order of acts. For example, acts can occur in various orders and/or concurrently, and with other acts not presented or described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Referring now to FIG. 10, a methodology 1000 for performing operations corresponding to a cloud-based storage system is illustrated, in accordance with various example embodiments. The method 1000 can commence at act 1002 where a trivial snapshot version (e.g., instance) of an enterprise storage array (e.g., a grouping or a sub-grouping of data persisted to the enterprise storage array) can be created (e.g., by snapshot engine 102). When snapshot engine 102 creates or generates the trivial snapshot version of trivial snapshot instance, snapshot engine 102 can associate one or more attributes to the created trivial snapshot instance or trivial snapshot version. Examples of the one or more attributes can comprise a state attribute (e.g., "not-used" or "marked for deletion); duration attributes (e.g., a define or definable time period during which system 100 will maintain the created trivial snapshot instance in the enterprise storage array); attributes pertaining to whether or not a trivial snapshot instance has been refreshed; attributes pertaining to whether or not a trivial snapshot instance has been restored; and/or attributes pertaining to whether or not the trivial snapshot instance has been linked. At 1004 system 100 (e.g., snapshot engine 102) can determine whether or not the trivial snapshot version has been accessed within a defined or definable time. At 1006, in response to, or based on, the defined period of time having expired, deleting the trivial snapshot version from the enterprise storage array.

Reference throughout this specification to "one embodiment," or "an embodiment," means that a particular feature, structure, or characteristic described in connection with the embodiment is included in at least one embodiment. Thus, the appearances of the phrase "in one embodiment," or "in an embodiment," in various places throughout this specification are not necessarily all referring to the same embodiment. Furthermore, the particular features, structures, or characteristics may be combined in any suitable manner in one or more embodiments.

Furthermore, to the extent that the terms "includes," "has," "contains," and other similar words are used in either the detailed description or the appended claims, such terms are intended to be inclusive—in a manner similar to the term "comprising" as an open transition word—without precluding any additional or other elements. Moreover, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

As utilized herein, the terms "logic," "logical," "logically," and the like are intended to refer to any information having the form of instruction signals and/or data that may be applied to direct the operation of a processor. Logic may be formed from signals stored in a device memory. Software is one example of such logic. Logic may also be comprised by digital and/or analog hardware circuits, for example, hardware circuits comprising logical AND, OR, XOR, NAND, NOR, and other logical operations. Logic may be formed from combinations of software and hardware. On a network, logic may be programmed on a server, or a complex of servers. A particular logic unit is not limited to a single logical location on the network.

As utilized herein, terms "component," "system," "engine", and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server, client, etc. and the server, client, etc. can be a component. One or more components can reside within a process, and a component can be localized on one computer and/or distributed between two or more computers.

Further, components can execute from various computer readable media having various data structures stored thereon. The components can communicate via local and/or remote processes such as in accordance with a signal having one or more data packets (e.g., data from one component interacting with another component in a local system, distributed system, and/or across a network, e.g., the Internet, with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. In yet another example, a component can be an apparatus that provides specific functionality through electronic components without mechanical parts; the electronic components can comprise one or more processors therein to execute software and/or firmware that confer(s), at least in part, the functionality of the electronic components.

Aspects of systems, apparatus, and processes explained herein can constitute machine-executable instructions embodied within a machine, e.g., embodied in a computer readable medium (or media) associated with the machine. Such instructions, when executed by the machine, can cause the machine to perform the operations described. Additionally, the systems, processes, process blocks, etc. can be embodied within hardware, such as an application specific integrated circuit (ASIC) or the like. Moreover, the order in which some or all of the process blocks appear in each process should not be deemed limiting. Rather, it should be understood by a person of ordinary skill in the art having the benefit of the instant disclosure that some of the process blocks can be executed in a variety of orders not illustrated.

Furthermore, the word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art having the benefit of the instant disclosure.

The disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can comprise, but are not limited to: random access memory (RAM); read only memory (ROM); electrically erasable programmable read only memory (EEPROM); flash memory or other memory technology (e.g., card, stick, key drive, thumb drive, smart card); solid state drive (SSD) or other solid-state storage technology; optical disk storage (e.g., compact disk (CD) read only memory (CD ROM), digital video/versatile disk (DVD), Blu-ray disc); cloud-based (e.g., Internet based) storage; magnetic storage (e.g., magnetic cassettes, magnetic tape, magnetic disk storage or other magnetic storage devices); a virtual device that emulates a storage device and/or any of the above computer-readable media; or other tangible and/or non-transitory media which can be used to store desired information. In this regard, the terms "tangible" or "non-transitory" herein as applied to storage, memory, or computer-readable media, are to be understood to exclude only propagating transitory signals per se as modifiers and do not relinquish rights to all standard storage, memory or computer-readable media that are not only propagating transitory signals per se.

Artificial intelligence based systems, e.g., utilizing explicitly and/or implicitly trained classifiers, can be employed in connection with performing inference and/or probabilistic determinations and/or statistical-based determinations as in accordance with one or more aspects of the disclosed subject matter as described herein. For example, an artificial intelligence system can be used to store a batch of objects in a group of data chunks, and based on a determination that respective data chunks of the group of data chunks contain a defined amount of data, seal, erasure encode, and replicate the respective data chunks, as described herein.

A classifier can be a function that maps an input attribute vector, x=(x1, x2, x3, x4, xn), to a confidence that the input belongs to a class, that is, f(x)=confidence (class). Such classification can employ a probabilistic and/or statistical-based analysis (e.g., factoring into the analysis utilities and costs) to infer an action that a user desires to be automatically performed. In the case of communication systems, for example, attributes can be information received from access points, servers, components of a wireless communication network, etc., and the classes can be categories or areas of interest (e.g., levels of priorities). A support vector machine is an example of a classifier that can be employed. The support vector machine operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein can also be inclusive of statistical regression that is utilized to develop models of priority.

In accordance with various aspects of the subject specification, artificial intelligence based systems, components, etc. can employ classifiers that are explicitly trained, e.g., via a generic training data, etc. as well as implicitly trained, e.g., via observing characteristics of communication equipment, e.g., a server, etc., receiving reports from such communication equipment, receiving operator preferences, receiving historical information, receiving extrinsic information, etc. For example, support vector machines can be configured via a learning or training phase within a classifier constructor and feature selection module. Thus, the classifier(s) can be used by an artificial intelligence system to automatically learn and perform a number of functions, e.g., performed by snapshot engine 102.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

As it is employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions and/or processes described herein. Processors can exploit nano-scale architectures such as, but not limited to, molecular and quantum-dot based transistors, switches and gates, in order to optimize space usage or enhance performance of mobile devices. A processor may also be implemented as a combination of computing processing units.

In the subject specification, terms such as "store," "data store," "data storage," "database," "storage medium," "socket", and substantially any other information storage component relevant to operation and functionality of a system, component, and/or process, can refer to "memory components," or entities embodied in a "memory," or components comprising the memory. It will be appreciated that the memory components described herein can be either volatile memory or nonvolatile memory, or can comprise both volatile and nonvolatile memory.

By way of illustration, and not limitation, nonvolatile memory, for example, can be included in a data storage cluster, non-volatile memory 1222 (see below), disk storage 1224 (see below), and/or memory storage 1246 (see below). Further, nonvolatile memory can be included in read only memory (ROM), programmable ROM (PROM), electrically programmable ROM (EPROM), electrically erasable ROM (EEPROM), or flash memory. Volatile memory 1220 can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DR-RAM). Additionally, the disclosed memory components of systems or methods herein are intended to comprise, without being limited to comprising, these and any other suitable types of memory.

Figure 12:
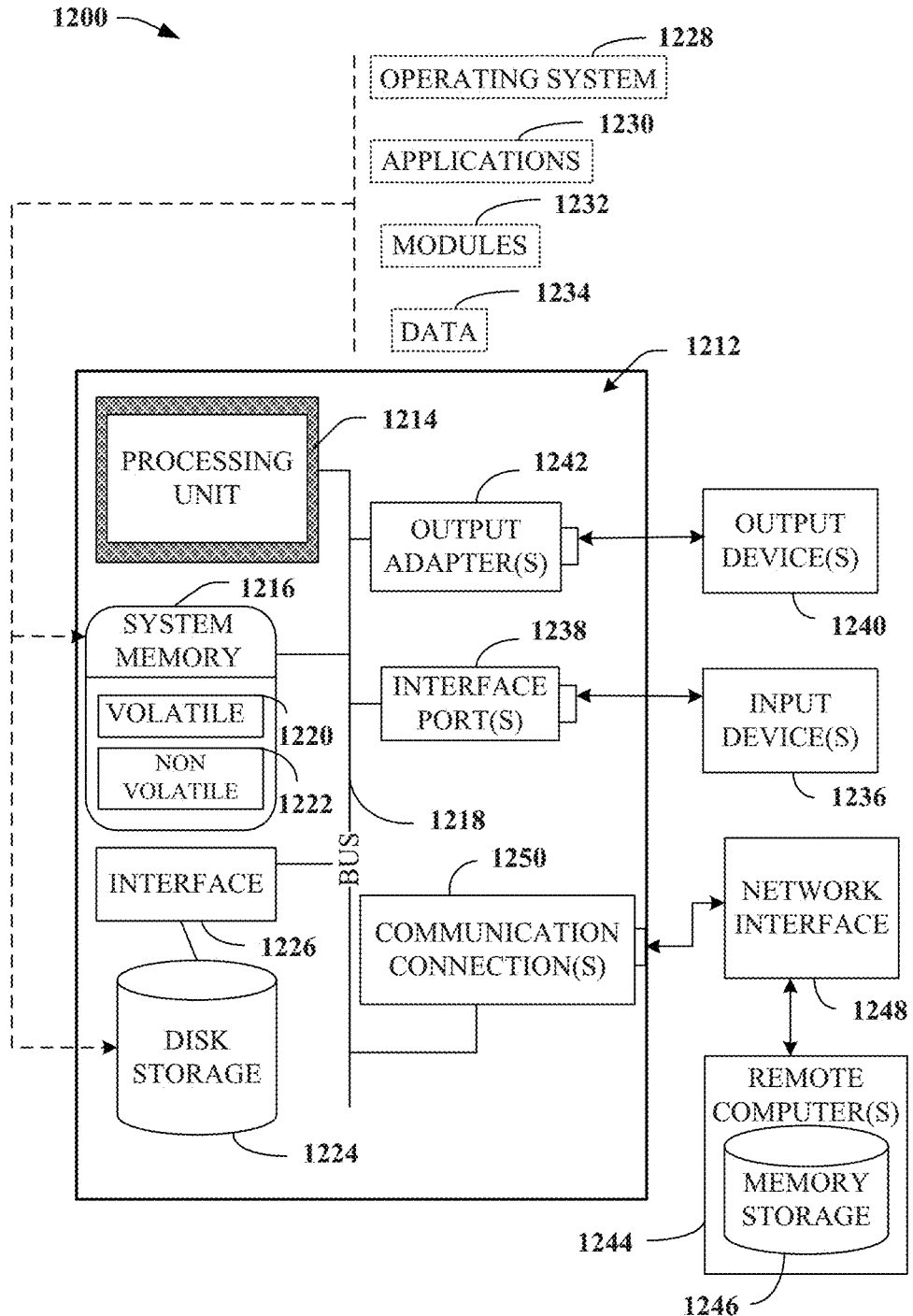
FIG. 12 illustrates a block diagram representing an illustrative non-limiting computing system or operating environment in which one or more aspects of various embodiments described herein can be implemented.

In order to provide a context for the various aspects of the disclosed subject matter, FIG. 12, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that various embodiments disclosed herein can be implemented in combination with other program modules. Generally, program modules comprise routines, programs, components, data structures, etc. that perform particular tasks and/or implement particular abstract data types.

Moreover, those skilled in the art will appreciate that the various systems can be practiced with other computer system configurations, comprising single-processor or multiprocessor computer systems, computing devices, mini-computing devices, mainframe computers, as well as personal computers, hand-held computing devices (e.g., PDA, phone, watch), microprocessor-based or programmable consumer or industrial electronics, and the like. The illustrated aspects can also be practiced in distributed computing environments where tasks are performed by remote processing devices that are linked through a communication network; however, some if not all aspects of the subject disclosure can be practiced on stand-alone computers. In a distributed computing environment, program modules can be located in both local and remote memory storage devices.

With reference to FIG. 12, a block diagram of a computing system 1200, e.g., system 100, operable to execute the disclosed systems and methods is illustrated, in accordance with an embodiment. Computer 1212 comprises a processing unit 1214, a system memory 1216, and a system bus 1218. System bus 1218 couples system components comprising, but not limited to, system memory 1216 to processing unit 1214. Processing unit 1214 can be any of various available processors. Dual microprocessors and other multiprocessor architectures also can be employed as processing unit 1214.

System bus 1218 can be any of several types of bus structure(s) comprising a memory bus or a memory controller, a peripheral bus or an external bus, and/or a local bus using any variety of available bus architectures comprising, but not limited to, industrial standard architecture (ISA), micro-channel architecture (MSA), extended ISA (EISA), intelligent drive electronics (IDE), VESA local bus (VLB), peripheral component interconnect (PCI), card bus, universal serial bus (USB), advanced graphics port (AGP), personal computer memory card international association bus (PCMCIA), Firewire (IEEE 1394), small computer systems interface (SCSI), and/or controller area network (CAN) bus used in vehicles.

System memory 1216 comprises volatile memory 1220 and nonvolatile memory 1222. A basic input/output system (BIOS), containing routines to transfer information between elements within computer 1212, such as during start-up, can be stored in nonvolatile memory 1222. By way of illustration, and not limitation, nonvolatile memory 1222 can comprise ROM, PROM, EPROM, EEPROM, or flash memory. Volatile memory 1220 comprises RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1212 also comprises removable/non-removable, volatile/non-volatile computer storage media. FIG. 12 illustrates, for example, disk storage 1224. Disk storage 1224 comprises, but is not limited to, devices like a magnetic disk drive, floppy disk drive, tape drive, Jaz drive, Zip drive, LS-100 drive, flash memory card, or memory stick. In addition, disk storage 1224 can comprise storage media separately or in combination with other storage media comprising, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1224 to system bus 1218, a removable or non-removable interface is typically used, such as interface 1226.

It is to be appreciated that FIG. 12 describes software that acts as an intermediary between users and computer resources described in suitable operating environment 1200. Such software comprises an operating system 1228. Operating system 1228, which can be stored on disk storage 1224, acts to control and allocate resources of computer system 1212. System applications 1230 take advantage of the management of resources by operating system 1228 through program modules 1232 and program data 1234 stored either in system memory 1216 or on disk storage 1224. It is to be appreciated that the disclosed subject matter can be implemented with various operating systems or combinations of operating systems.

A user can enter commands or information into computer 1212 through input device(s) 1236. Input devices 1236 comprise, but are not limited to, a pointing device such as a mouse, trackball, stylus, touch pad, keyboard, microphone, joystick, game pad, satellite dish, scanner, TV tuner card, digital camera, digital video camera, web camera, cellular phone, user equipment, smartphone, and the like. These and other input devices connect to processing unit 1214 through system bus 1218 via interface port(s) 1238. Interface port(s) 1238 comprise, for example, a serial port, a parallel port, a game port, a universal serial bus (USB), a wireless based port, e.g., Wi-Fi, Bluetooth, etc. Output device(s) 1240 use some of the same type of ports as input device(s) 1236.

Thus, for example, a USB port can be used to provide input to computer 1212 and to output information from computer 1212 to an output device 1240. Output adapter 1242 is provided to illustrate that there are some output devices 1240, like display devices, light projection devices, monitors, speakers, and printers, among other output devices 1240, which use special adapters. Output adapters 1242 comprise, by way of illustration and not limitation, video and sound devices, cards, etc. that provide means of connection between output device 1240 and system bus 1218. It should be noted that other devices and/or systems of devices provide both input and output capabilities such as remote computer(s) 1244.

Computer 1212 can operate in a networked environment using logical connections to one or more remote computers, such as remote computer(s) 1244. Remote computer(s) 1244 can be a personal computer, a server, a router, a network PC, a workstation, a microprocessor based appliance, a peer device, or other common network node and the like, and typically comprises many or all of the elements described relative to computer 1212.

For purposes of brevity, only a memory storage device 1246 is illustrated with remote computer(s) 1244. Remote computer(s) 1244 is logically connected to computer 1212 through a network interface 1248 and then physically and/or wirelessly connected via communication connection 1250. Network interface 1248 encompasses wire and/or wireless communication networks such as local-area networks (LAN) and wide-area networks (WAN). LAN technologies comprise fiber distributed data interface (FDDI), copper distributed data interface (CDDI), Ethernet, token ring and the like. WAN technologies comprise, but are not limited to, point-to-point links, circuit switching networks like integrated services digital networks (ISDN) and variations thereon, packet switching networks, and digital subscriber lines (DSL).

Communication connection(s) 1250 refer(s) to hardware/software employed to connect network interface 1248 to bus 1218. While communication connection 1250 is shown for illustrative clarity inside computer 1212, it can also be external to computer 1212. The hardware/software for connection to network interface 1248 can comprise, for example, internal and external technologies such as modems, comprising regular telephone grade modems, cable modems and DSL modems, wireless modems, ISDN adapters, and Ethernet cards.

The computer 1212 can operate in a networked environment using logical connections via wired and/or wireless communications to one or more remote computers, cellular based devices, user equipment, smartphones, or other computing devices, such as workstations, server computers, routers, personal computers, portable computers, microprocessor-based entertainment appliances, peer devices or other common network nodes, etc. The computer 1212 can connect to other devices/networks by way of antenna, port, network interface adaptor, wireless access point, modem, and/or the like.

The computer 1212 is operable to communicate with any wireless devices or entities operatively disposed in wireless communication, e.g., a printer, scanner, desktop and/or portable computer, portable data assistant, communications satellite, user equipment, cellular base device, smartphone, any piece of equipment or location associated with a wirelessly detectable tag (e.g., scanner, a kiosk, news stand, restroom), and telephone. This comprises at least Wi-Fi and Bluetooth wireless technologies. Thus, the communication can be a predefined structure as with a conventional network or simply an ad hoc communication between at least two devices.

Wi-Fi allows connection to the Internet from a desired location (e.g., a vehicle, couch at home, a bed in a hotel room, or a conference room at work, etc.) without wires. Wi-Fi is a wireless technology similar to that used in a cell phone that enables such devices, e.g., mobile phones, computers, etc., to send and receive data indoors and out, anywhere within the range of a base station. Wi-Fi networks use radio technologies called IEEE 802.11 (a, b, g, etc.) to provide secure, reliable, fast wireless connectivity. A Wi-Fi network can be used to connect communication devices (e.g., mobile phones, computers, etc.) to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 12BaseT wired Ethernet networks used in many offices.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
   determining, by a device comprising a processor, that a trivial snapshot instance representing a sub-grouping of storage devices, of a grouping of storage devices, included in an enterprise storage array device has not been accessed within a defined duration of time value, wherein the sub-grouping of storage devices is determined based on a first storage device of the sub-grouping being associated with a specified low service level objective and a second storage device of the sub-grouping being associated with a specified medium service level objective;
   marking, by the device, the trivial snapshot instance for deletion from the enterprise storage array device based on an expiration of the defined duration of time value and a determination that the trivial snapshot instance has been subject to an application of a refresh operation;
   associating, by the device, a duration property with the trivial snapshot instance, wherein the duration property indicates a lifespan time value for an existence of the trivial snapshot instance after the marking of the trivial snapshot instance; and responsive to the lifespan time value expiring, deleting, by the device, the trivial snapshot instance from the enterprise storage array device.

2. The method of claim 1, further comprising associating, by the device, the trivial snapshot instance with an attribute representing the defined duration of time value.

3. The method of claim 1, further comprising associating, by the device, the trivial snapshot instance with a state attribute representing a state value.

4. The method of claim 3, wherein the state value represents an un-used state of the trivial snapshot instance.

5. The method of claim 3, wherein the state value represents a marked for deletion state of the trivial snapshot instance.

6. The method of claim 1, further comprising determining, by the device, that a restore operation has been applied to the trivial snapshot instance.

7. The method of claim 6, further comprising determining, by the device, that the restore operation applied to the trivial snapshot instance has completed.

8. The method of claim 7, further comprising, in response to determining that the restore operation as applied to the trivial snapshot instance has completed, marking, by the device, the trivial snapshot instance for the deletion.

9. A non-transitory machine-readable medium comprising instructions that, in response to execution, cause a system comprising a processor to perform operations, comprising:
determining that a trivial snapshot instance representing a group of data included in an enterprise storage array device has not been accessed within a defined duration of time value, wherein the trivial snapshot instance comprises a first group of storage devices and a second group of storage devices, wherein the first group of storage devices is associated with a first service level objective and the second group of storage devices is associated with a second service level objective, and wherein the first service level objective and the second service level objective are hierarchically subordinate to a third service level objective associated with a collection of production storage devices;
marking the trivial snapshot instance for deletion from the enterprise storage array device based on an expiration of the defined duration of time value and in response to an initiation of a refresh operation being initiated against the trivial snapshot instance;
associating a duration property with the trivial snapshot instance, wherein the duration property represents a lifespan time value for an existence of the trivial snapshot instance after the marking of the trivial snapshot instance; and
in response to determining that the lifespan time value has expired, deleting the trivial snapshot instance from the enterprise storage array device.

10. The non-transitory machine-readable medium of claim 9, wherein the operations further comprise determining that the refresh operation has been applied to the trivial snapshot instance prior to the expiration of the defined duration of time value.

11. The non-transitory machine-readable medium of claim 9, wherein the operations further comprise determining that the refresh operation applied to the trivial snapshot instance has completed prior to the expiration of the defined duration of time value.

12. The non-transitory machine-readable medium of claim 9, wherein the operations further comprise determining that a unlink operation has been performed on the trivial snapshot instance.

13. A system, comprising:
a processor; and
a memory that stores executable instructions that, when executed by the processor, facilitate performance of operations, comprising:
creating a trivial snapshot version of an enterprise storage array device based on a group of snapshot creation parameters, wherein the trivial snapshot version is created from a group of devices associated with the enterprise storage array having been designated as having a defined low service level objective and a defined medium service level objective;
based on determining that the trivial snapshot version has been accessed within a defined expiration threshold value, and further based on determining that a refresh operation has been applied to the trivial snapshot version, marking the trivial snapshot version for deletion;
associating a duration property with the trivial snapshot version, wherein the duration property is indicative of a lifespan time value for an existence the trivial snapshot version after the marking of the trivial snapshot version; and
in response to determining that the lifespan time value has expired, deleting the trivial snapshot version from the enterprise storage array device.

14. The system of claim 13, wherein the group of snapshot creation parameters comprises the defined expiration threshold value.

15. The system of claim 13, wherein the group of snapshot creation parameters comprises a state attribute.

16. The system of claim 15, wherein the state attribute is data representing an un-used state associated with the trivial snapshot version.

17. The system of claim 15, wherein the state attribute is data representative of a marked for deletion state associated with the trivial snapshot version as a result of the marking.

18. The system of claim 13, wherein the operations further comprise determining that a link operation has been applied to the trivial snapshot version.

19. The system of claim 18, wherein the operations further comprise determining that the link operation has completed.

20. The system of claim 19, wherein the operations further comprise in response to completion of the link operation, performing the marking the trivial snapshot version for the deletion.

* * * * *